United States Patent
Khairallah et al.

(10) Patent No.: US 11,141,912 B2
(45) Date of Patent: Oct. 12, 2021

(54) ADDITIVE MANUFACTURING POWDER SPREADING TECHNOLOGY TO MITIGATE SURFACE DEFECTS

(71) Applicant: LAWRENCE LIVERMORE NATIONAL SECURITY, LLC, Livermore, CA (US)

(72) Inventors: Saad A. Khairallah, Livermore, CA (US); Gabe Guss, Manteca, CA (US); Eric B. Herbold, Hayward, CA (US); Wayne E. King, Danville, CA (US); Manyalibo J. Matthews, Livermore, CA (US); Alexander M. Rubenchik, Livermore, CA (US); Otis R. Walton, Livermore, CA (US)

(73) Assignee: Lawrence Livermore National Laboratory, LLC, Livermore, CA (US)

( * ) Notice: Subject to any disclaimer, the term of this patent is extended or adjusted under 35 U.S.C. 154(b) by 111 days.

(21) Appl. No.: 16/598,260

(22) Filed: Oct. 10, 2019

(65) Prior Publication Data
US 2021/0107214 A1    Apr. 15, 2021

(51) Int. Cl.
| | |
|---|---|
| *B29C 64/153* | (2017.01) |
| *B29C 64/205* | (2017.01) |
| *B29C 64/268* | (2017.01) |
| *B29C 64/245* | (2017.01) |
| *B29C 64/35* | (2017.01) |
| *B33Y 40/00* | (2020.01) |
| *B33Y 10/00* | (2015.01) |
| *B33Y 30/00* | (2015.01) |

(52) U.S. Cl.
CPC ......... *B29C 64/153* (2017.08); *B29C 64/205* (2017.08); *B29C 64/245* (2017.08); *B29C 64/268* (2017.08); *B29C 64/35* (2017.08); *B33Y 10/00* (2014.12); *B33Y 30/00* (2014.12); *B33Y 40/00* (2014.12)

(58) Field of Classification Search
CPC ..... B29C 64/35; B29C 64/153; B29C 64/245; B29C 64/268; B29C 64/205; B29C 64/214; B29C 64/218
See application file for complete search history.

(56) References Cited

U.S. PATENT DOCUMENTS

| | | |
|---|---|---|
| 4,944,817 A | 7/1990 | Bourell et al. |
| 5,155,324 A | 10/1992 | Deckard et al. |
| 9,669,583 B2 | 6/2017 | Ferrar |
| (Continued) | | |

FOREIGN PATENT DOCUMENTS

| | | | | |
|---|---|---|---|---|
| DE | 102010008781 A1 * | 8/2011 | ........... | B29C 64/153 |
| DE | 102013221014 A1 * | 4/2015 | ........... | B29C 64/357 |
| (Continued) | | | | |

*Primary Examiner* — Joseph S Del Sole
*Assistant Examiner* — Ariella Machness
(74) *Attorney, Agent, or Firm* — Eddie E. Scott

(57) ABSTRACT

A laser powder bed fusion additive manufacturing system having a powder dispenser that provides powder layers on a build platform; a laser fusion system that fuses the powder layers, wherein spatter particles are produce on the powder layers; and a powder bed sweeping system that sweeps the spatter particles from the powder layers. The powder bed sweeping system includes a brush that has bristles that contact the spatter particles and sweeps the spatter particles from the powder layers.

4 Claims, 11 Drawing Sheets

(56) References Cited

U.S. PATENT DOCUMENTS

| | | |
|---|---|---|
| 10,220,471 B2 | 3/2019 | Khairallah |
| 2004/0084814 A1* | 5/2004 | Boyd ................... B33Y 40/00 |
| | | 264/497 |
| 2015/0177158 A1* | 6/2015 | Cheverton ............. B22F 10/20 |
| | | 700/119 |
| 2018/0124341 A1* | 5/2018 | Harding ............. B28B 17/0072 |

FOREIGN PATENT DOCUMENTS

| | | | | |
|---|---|---|---|---|
| EP | 3517298 A1 | * | 7/2019 | ............. B22F 10/20 |
| WO | WO-2015196149 A1 | * | 12/2015 | ............. B22F 3/004 |

* cited by examiner

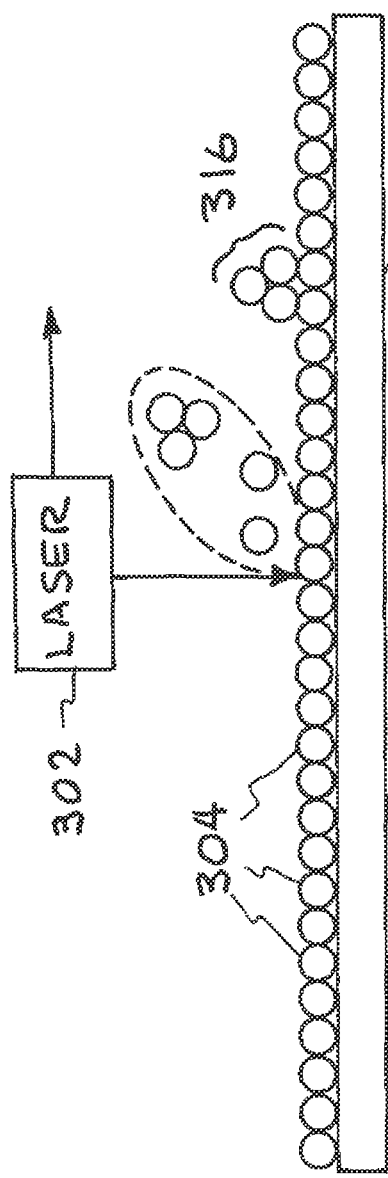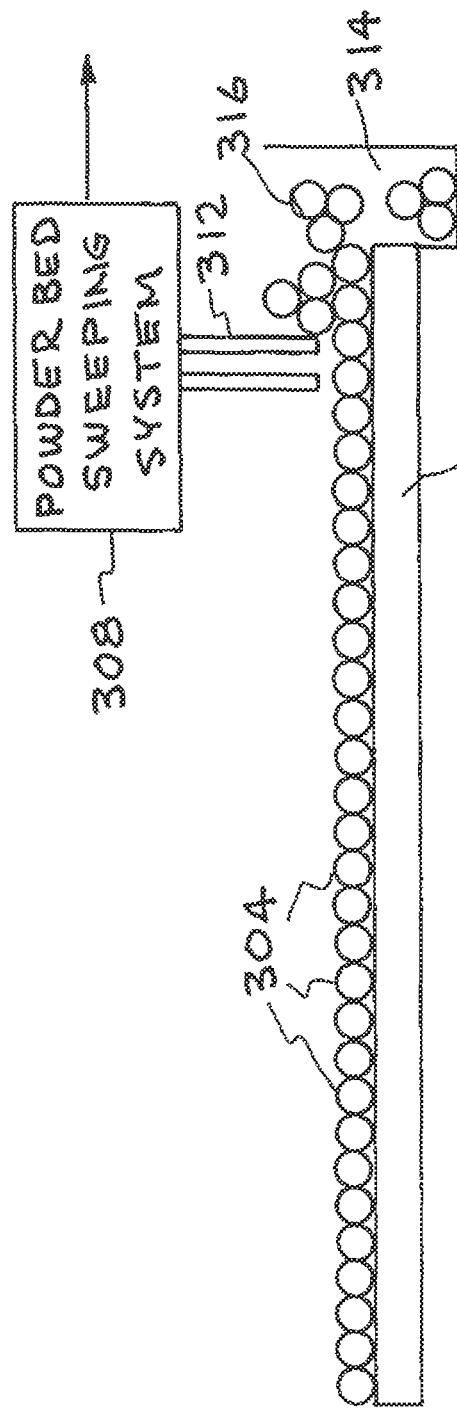
FIG. 3A
FIG. 3B

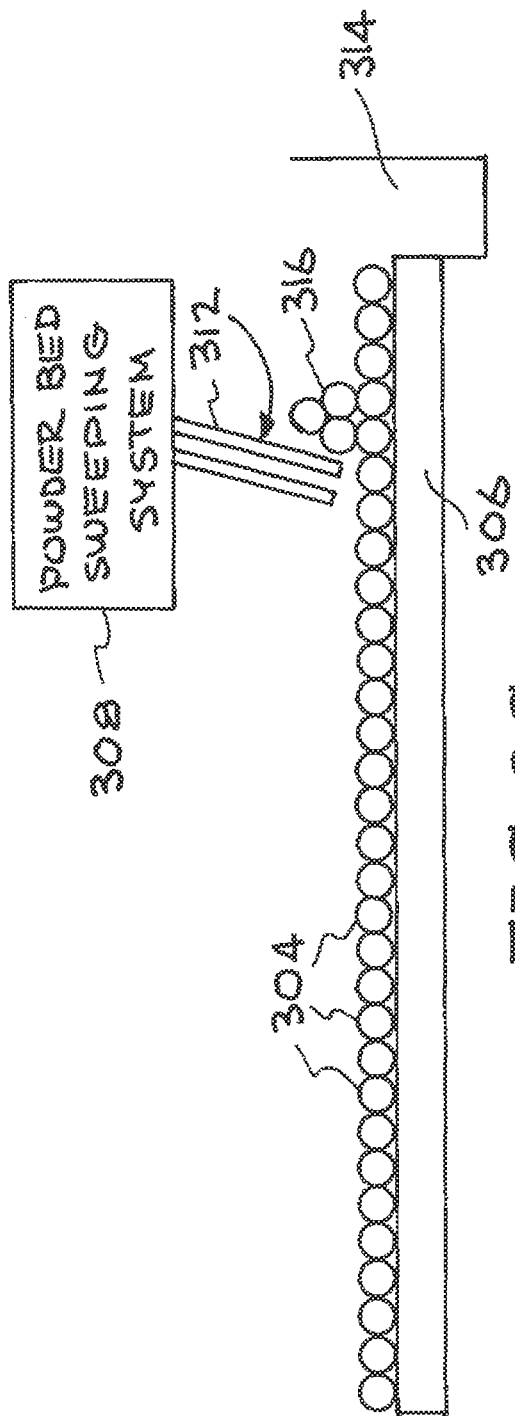
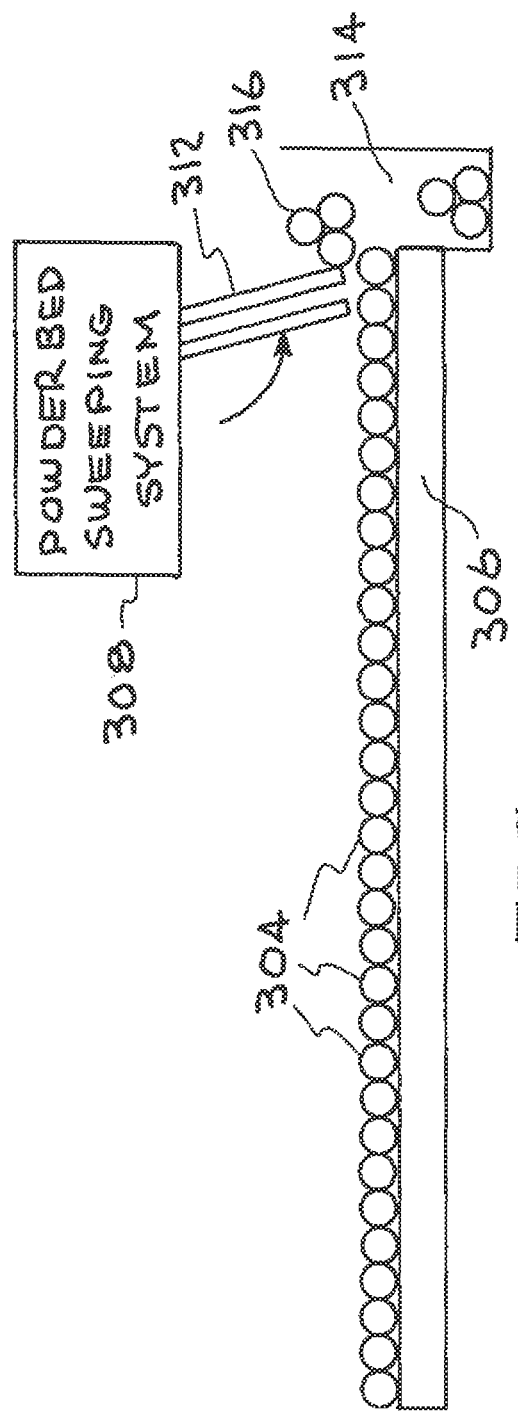
FIG. 3C
FIG. 3D

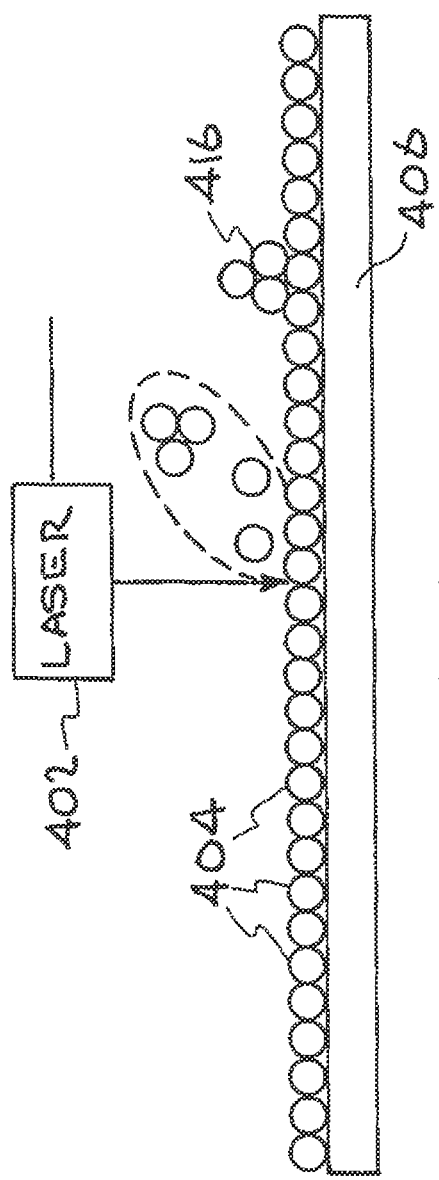
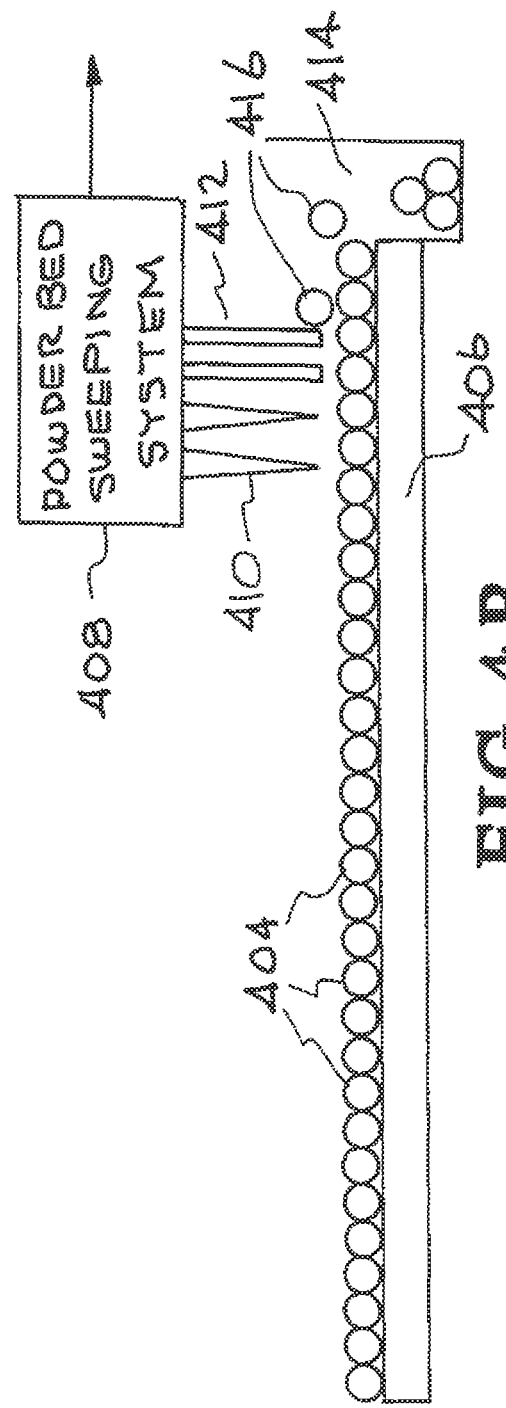

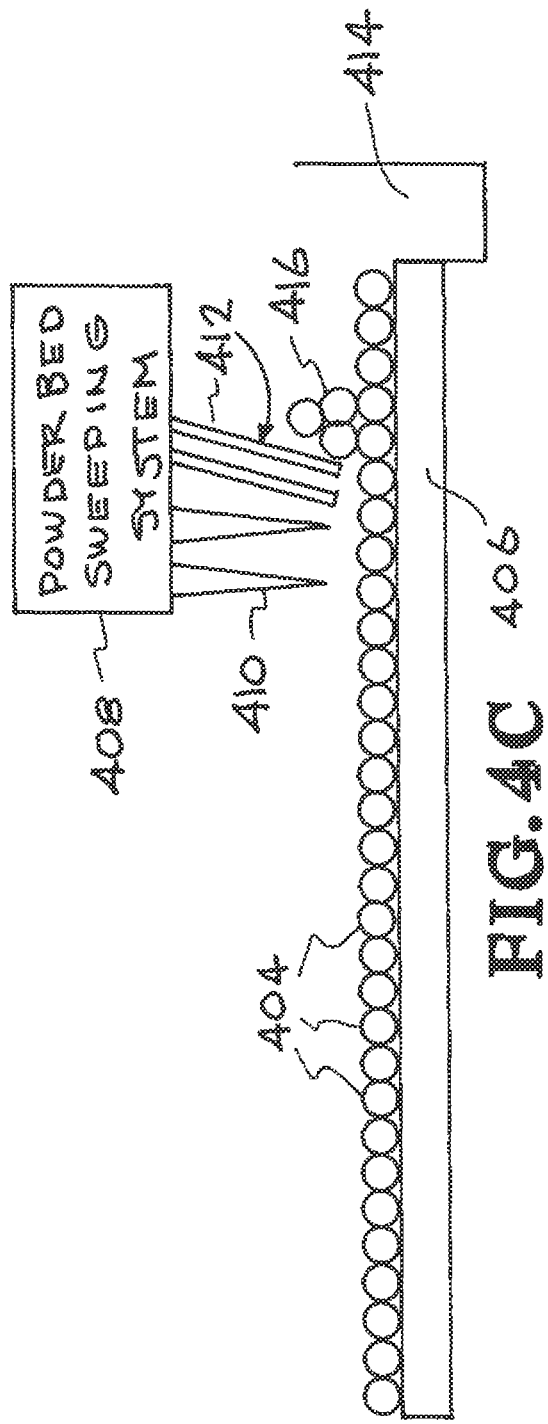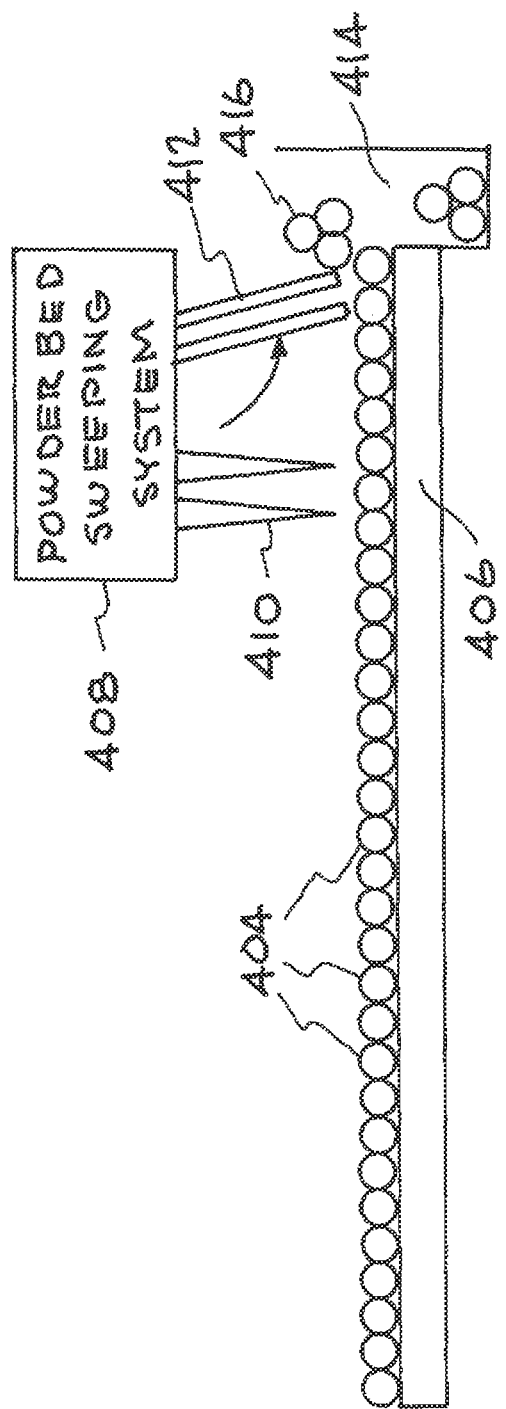

ADDITIVE MANUFACTURING POWDER SPREADING TECHNOLOGY TO MITIGATE SURFACE DEFECTS

STATEMENT AS TO RIGHTS TO APPLICATIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to additive manufacturing powder spreading technology to mitigate surface defects.

State of Technology

This section provides background information related to the present disclosure which is not necessarily prior art.

In selective laser melting (SLM) for additive manufacturing (AM), a layer of powder is spread over a build platform. A laser fuses the first layer of the product. A new layer of powder is spread across the previous layer. The laser fuses the new layer of the product. Further layers are added and fused to complete the product. Any high speed video on selective laser melting (SLM) for additive manufacturing (AM) processes will show bright sparks accompanied by the movement of the laser beam. These sparks are droplets ejected from the melt pool as spatter, and can be a source of problem for AM. Spatter can affect the physical and mechanical properties of the build.

During SLM, powder particles are put in motion by the aerodynamics of the vapor plume. Some of these particles collide, coalesce and form clusters or conglomeration of partially melted particles fusing all together. These clusters can have negative effects on the build process. When these clusters fall back on top of the powder bed, they can cause defects, they change the local powder distribution and morphology.

U.S. Pat. No. 4,944,817 for multiple material systems for selective beam melting issued Jul. 31, 1990 to David L. Bourell et al and assigned to Board of Regents, The University of Texas System provides the state of technology information reproduced below.

"A method and apparatus for selectively melting a layer of powder to produce a part comprising a plurality of fused layers. The apparatus includes a computer controlling a laser to direct the laser energy onto the powder to produce a fused mass. The computer either determines or is programmed with the boundaries of the desired cross-sectional regions of the part. For each cross-section, the aim of the laser beam is scanned over a layer of powder and the beam is switched on to fuse only the powder within the boundaries of the cross-section. Powder is applied and successive layers fused until a completed part is formed."

U.S. Pat. No. 5,155,324 for a method for selective laser sintering with layerwise cross-scanning issued Oct. 12, 1992 to Carl R, Deckard et al, University of Texas at Austin, provides the state of technology information reproduced below.

"Selective laser sintering is a relatively new method for producing parts and other freeform solid articles in a layer-by-layer fashion. This method forms such articles by the mechanism of sintering, which refers to a process by which particulates are made to form a solid mass through the application of external energy. According to selective laser sintering, the external energy is focused and controlled by controlling the laser to sinter selected locations of a heat-fusible powder. By performing this process in layer-by-layer fashion, complex parts and freeform solid articles which cannot be fabricated easily (if at all) by subtractive methods such as machining can be quickly and accurately fabricated. Accordingly, this method is particularly beneficial in the production of prototype parts, and is particularly useful in the customized manufacture of such parts and articles in a unified manner directly from computer-aided-design (CAD) or computer-aided-manufacturing (CAM) data bases."

"Selective laser sintering is performed by depositing a layer of a heat-fusible powder onto a target surface; examples of the types of powders include metal powders, polymer powders such as wax that can be subsequently used in investment casting, ceramic powders, and plastics such as ABS plastic, polyvinyl chloride (PVC), polycarbonate and other polymers. Portions of the layer of powder corresponding to a cross-sectional layer of the part to be produced are exposed to a focused and directionally controlled energy beam, such as generated by a laser having its direction controlled by mirrors, under the control of a computer. The portions of the powder exposed to the laser energy are sintered into a solid mass in the manner described hereinabove. After the selected portions of the layer have been so sintered or bonded, another layer of powder is placed over the layer previously selectively sintered, and the energy beam is directed to sinter portions of the new layer according to the next cross-sectional layer of the part to be produced. The sintering of each layer not only forms a solid mass within the layer, but also sinters each layer to previously sintered powder underlying the newly sintered portion. In this manner, the selective laser sintering method builds a part in layer-wise fashion, with flexibility, accuracy, and speed of fabrication superior to conventional machining methods."

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's apparatus, systems, and methods provide a process based on simulation work and deep understanding of the physics of laser powder bed fusion process. During the process, powder particles are put in motion by the aerodynamics of the vapor plume. Some of these particles collide, coalesce and form clusters or conglomeration of partially melted particles fusing all together. These clusters can have negative effects on the build process. When these clusters fall back on top of the powder bed, they can cause defects, they change the local powder distribution and morphology. The invention describes a method to collect these clusters and flush them out of the system.

The inventor's apparatus, systems, and methods in various embodiments provide laser powder bed fusion additive manufacturing for producing a product and reducing spattering wherein a powder bed sweeping system sweeps spatter particles from the powder layers. In one embodiment the inventor's apparatus, systems, and methods includes a powder dispenser that provides powder layers on a build platform; a laser fusion system that fuses the powder layers, wherein spatter particles are produce on the powder layers; and a powder bed sweeping system that sweeps the spatter particles from the powder layers. The powder bed sweeping system includes a brush that has bristles that contact the spatter particles and sweeps the spatter particles from the powder layers.

The inventor's apparatus, systems, and methods have use in additive manufacturing machines that use energy beams to create AM parts for any application using powder bed fusion process.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIG. 3A is an illustration showing laser scan fusion performed on the first powder layer.

FIG. 3B is an illustration showing one embodiment of a powder bed sweeping system employed to proceed across the fused powder sweeping "clumps or spatter" particles as well as any excess powder into a collection unit.

FIG. 3C is an illustration of the powder bed sweeping system showing tilted bristles beginning to sweep the "clumps or spatter" particles as well as any excess powder into the collection unit.

FIG. 3D is an illustration of the powder bed sweeping system showing the tilted bristles completing the sweeping of the "clumps or spatter" particles as well as any excess powder into the collection unit.

FIG. 4A is an illustration showing laser scan fusion performed on the first powder layer.

FIG. 4B is an illustration showing a second embodiment of a powder bed sweeping system employed to proceed across the fused powder sweeping "clumps or spatter" particles as well as any excess powder into a collection unit.

FIG. 4C is an illustration of the second embodiment powder bed sweeping system showing tilted bristles beginning to sweep the "clumps or spatter" particles as well as any excess powder into the collection unit.

FIG. 4D is an illustration of the second embodiment powder bed sweeping system showing the tilted bristles completing the sweeping of the "clumps or spatter" particles as well as any excess powder into the collection unit.

DETAILED DESCRIPTION OF SPECIFIC EMBODIMENTS

Figure 1:
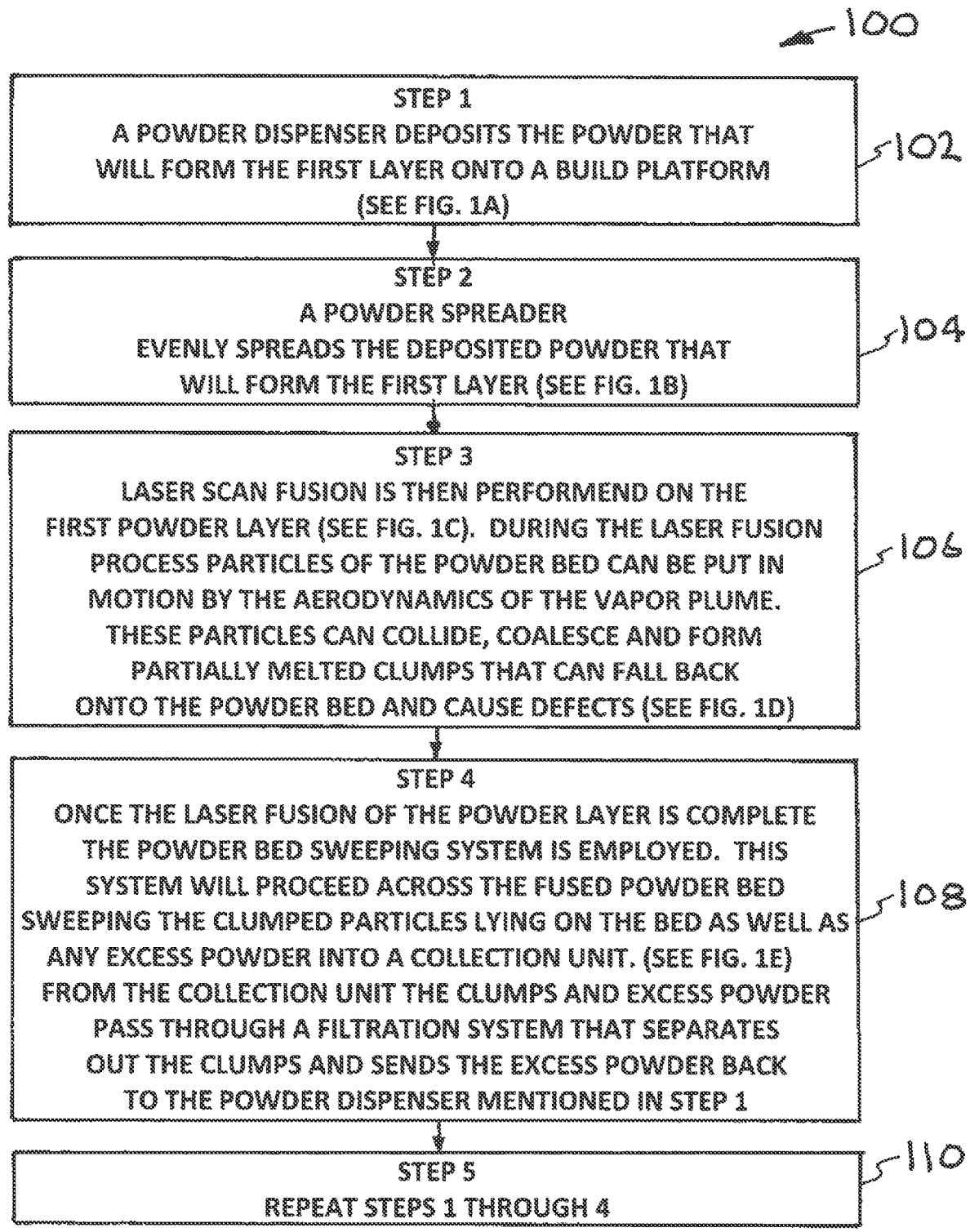
FIG. 1 is a flow chart that provides background and descriptive information regarding Applicant's apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Figure 2A:
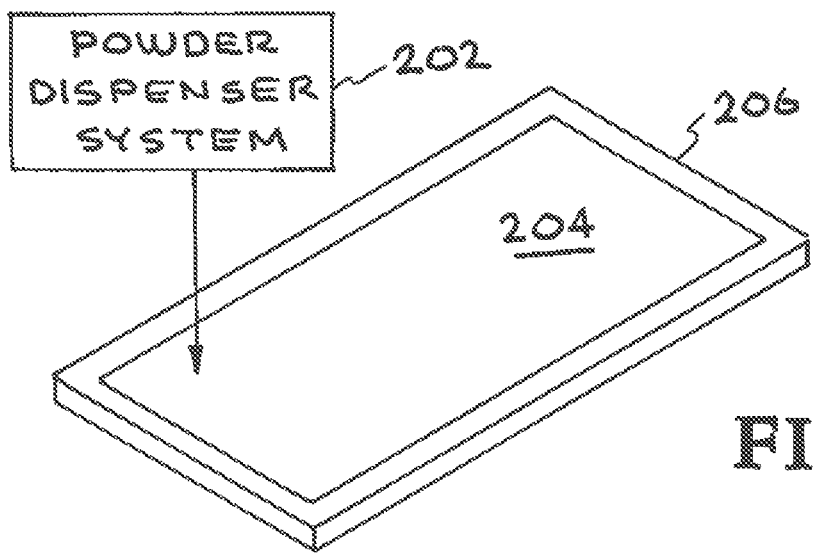
FIG. 2A is a schematic illustration of a powder dispenser that deposits powder onto a build platform.
Figure 2B:
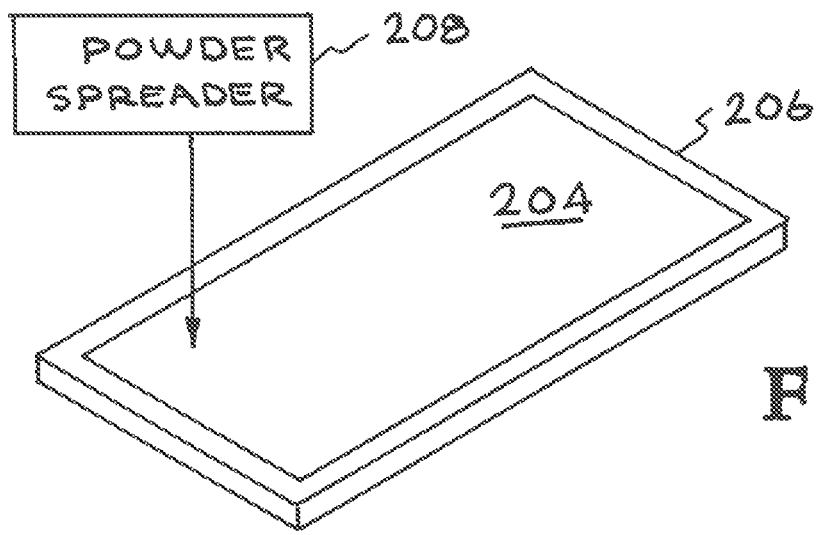
FIG. 2B is an illustration of a separate, horizontally movable, spreader that is used to spread the powder on the build plane.
Figure 2C:
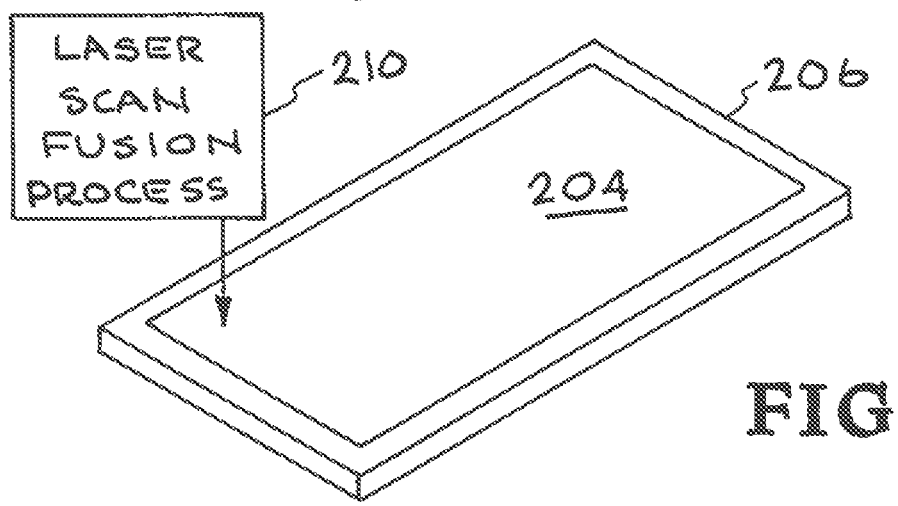
FIG. 2C is an illustration that shows laser scan fusion performed on the first powder layer.
Figure 2D:
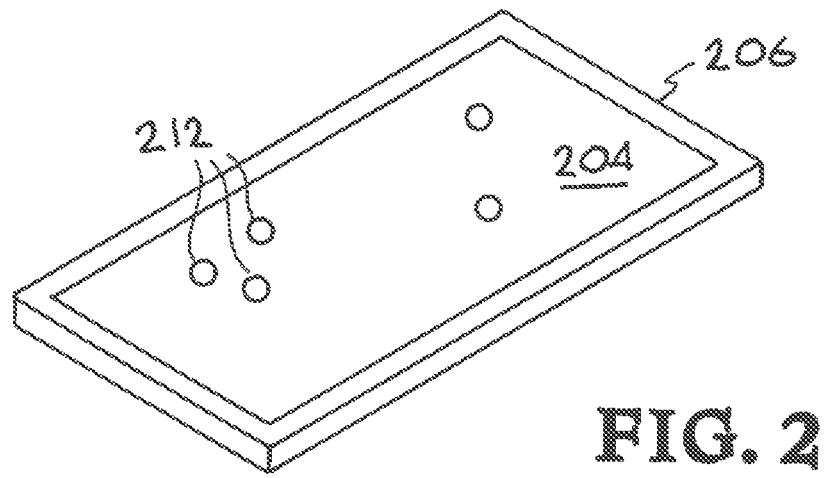
FIG. 2D is an illustration that shows "clumps or spatter" particles on the powder on the build plane.

Referring now to the drawings, and in particular to FIG. 1, background and descriptive information regarding Applicants' apparatus, systems, and methods are illustrated by a flow chart. The flow chart is designated generally by the reference numeral 100. The flow chart of FIG. 1 includes the following steps:

Flow Chart Step 1—Reference Numeral #102—A powder dispenser deposits the powder that will form the first layer onto a build platform (See FIG. 2A);

Flow Chart Step 2—Reference Numeral #104—A powder spreader evenly spreads the deposited powder that will form the first layer (See FIG. 2B);

Flow Chart Step 3—Reference Numeral #106—Laser scan fusion is then performed on the first powder layer (See FIG. 2C), during the laser fusion process particles of the powder bed can be put in motion by the aerodynamics of the vapor plume, these particles can collide, coalesce and form partially melted clumps that can fall back onto the powder bed and cause defects (See FIG. 2D);

Flow Chart Step 4—Reference Numeral #108—Once the laser fusion of the powder layer is complete the powder bed sweeping system is employed, this system will proceed across the fused powder bed sweeping the clumped particles lying on the bed as well as any excess powder into a collection unit (See FIG. 2E), from the collection unit the clumps and excess powder pass through a filtration system that separates out the clumps and sends the excess powder back to the powder dispenser mentioned in step 1; and Flow Chart Step 5—Reference Numeral #110—Repeat steps 1 through 4.

The identification and description of the steps illustrated in the flow chart 100 of FIG. 1 having been completed, the operation and additional description of the inventor's Applicant's apparatus, systems, and methods that provide powder spreading technology to mitigate surface defects will now be considered in greater detail.

Initially a powder dispenser deposits the powder that will form the first layer of the product onto a build platform as identified in flow chart step 1, reference numeral 102. Many existing commercial and research metal additive manufacturing machines are based on laser powder-bed fusion or laser powder-bed melting processes in which a solid part is built from feedstock metal powder in a layer by layer process. In typical commercial systems feedstock powder is filled into a rectangular powder-reservoir bin which is deep enough to hold powder for at least a significant fraction of the entire build. The top surface of the powder in the powder-reservoir is leveled to a uniform height flush with the surrounding planar surface before the build process starts. The floor beneath the powder in the powder-reservoir bin has means of raising the entire powder bed by a precisely controlled increment so that a known quantity of powder becomes elevated above the surrounding horizontal planar surface. A build plate located close to the powder-reservoir bin is also elevation adjustable. The build plate forms an elevation-adjustable floor for a receiver bin. The build plate starts out at the top of this receiver bin and for each powder layer it is lowered a small, precisely controlled, amount to form a space to receive the new layer of powder.

A separate, horizontally movable, spreader is used to scrape the elevated powder from the top surface of the powder reservoir as identified in flow chart step 2, reference numeral 104. The spreader design is typically a straight rigid metal blade, a flexible blade of a compliant material (e.g. rubber, flexible polymer), or a cylindrical configuration with controlled rotation speed. The height of the spreader does not change during its horizontal spreading motion, although some designs allow the spreader (blade or roller) to be elevated during its return motion for the next layer, to avoid any possible damage to the part being manufactured during the spreader's return motion. The amount of powder in a single spreading step is controlled by the elevation change in the powder-reservoir floor before the spreader moves across the top surface of the powder-reservoir, scraping off the elevated powder to form one new powder layer on the build plate. The depth of powder deposited on the build plate is determined by a precisely controlled elevation reduction (i.e., lowering) of the build plate before each powder-spreading step. Before each spreading layer is deposited, the build plate is lowered into the receiver bin which contains the part being built along with all of the powder from the previously delivered layers of powder that were not scraped beyond the far edge of the build plate during each powder layer spreading step.

Laser scan fusion is then performed on the first powder layer as identified in flow chart step 3, reference numeral 106. The laser melting or melting process, to form the new layer of solid metal material on the part or parts being made, takes place after each new layer of powder has been spread onto the build plate. In this melting or melting process, a precisely controlled laser spot is scanned over the portions of the powder bed on the build plate to melt or fuse the powder to form a solid metal part. In addition to the uniformity of the powder layer, the laser power, spot size, scan rate, and scan path, all affect the quality of the parts formed. In the process of scanning the laser to melt or fuse powder to form the part, occasional liquid metal and/or metal-vapor is blown out of the transient melt-pool created by the laser as it fuses the powder to form the new part layer.

The droplets of liquid and vapor metal being blown out of the melt pool can also entrain nearby solid particles. These clumps of metal material that can occasionally come out of the melt pool region during the laser scan process can contain resolidified melted metal and unmelted powder particles. They are often referred to as "spatter particles" and can be formed when several particles come together and are fused/melted together to form an arbitrary shape. They can be significantly larger than the typical feedstock powder. They will be referred to as parasite particles or oversized particles in this document. The spatter particles can land at random locations anywhere on the build plate. Those spatter particles which are significantly larger than the original particles in the powder feedstock can have adverse effects on the powder spreading process, which can also decrease the quality of the parts produced. The effects include but are not limited to: uncontrollable change in the morphology of the powder, uncontrollable change in powder size distribution, production of pores when the laser goes over the parasites and cannot melt deep down to the substrate, pores act as stress concentrators that can cause earlier failure of the part, the presence of one large parasite can increase the likelihood of producing another large spatter in a chain reaction type of process.

Once the laser fusion of the powder layer is complete the inventor's powder bed sweeping system is employed as identified in flow chart step 4, reference numeral 108. The sweeping system will proceed across the fused powder bed sweeping the clumped particles lying on the bed as well as any excess powder into a collection unit. The inventors' apparatus, systems, and methods address ways to ameliorate the adverse effects of oversize spatter particles which may be located at any random location in the top layer of the build plate powder after completion of a laser scan process for any single layer. The aim of the apparatus, systems, and methods is to minimize any adverse effects that oversize spatter particles on the build plate might cause in subsequent powder spreading or in final part quality.

The final product is produced by repeating steps 1 through 4 as identified in flow chart step 5, reference numeral 110. Laser scan fusion is performed on each powder layer to produce the final product.

Referring now to FIGS. 2A through 2E, schematic illustrations provide additional information and description of Applicant's apparatus, systems, and methods that were illustrated by the flow chart of FIG. 1. FIG. 2A is a schematic illustration of a powder dispenser 202 that deposits powder 204 onto a build platform 206. The powder 204 will form the first layer of the product being produced. In typical commercial systems feedstock powder is filled into a rectangular powder-reservoir bin which is deep enough to hold powder for at least a significant fraction of the entire build. The top surface of the powder in the powder-reservoir is leveled to a uniform height flush with the surrounding planar surface before the build process starts. The floor beneath the powder in the powder-reservoir bin has means of raising the entire powder bed by a precisely controlled increment so that a known quantity of powder becomes elevated above the surrounding horizontal planar surface. A build plate located close to the powder-reservoir bin is also elevation adjustable. The build plate forms an elevation-adjustable floor for a receiver bin. The build plate starts out at the top of this receiver bin and for each powder layer it is lowered a small, precisely controlled, amount to form a space to receive the new layer of powder.

Referring to FIG. 2B, an illustration shows that a separate, horizontally movable, spreader 208 is used to spread the powder 204 on the build plane 206. The powder spreader 208 evenly spreads the deposited powder 204 that will form the first layer of the product being produced.

Referring to FIG. 2C, an illustration shows that laser scan fusion is performed on the first powder layer. Laser scan fusion 210 is performed on the powder 204 on the build plane 206. In the process of scanning the laser to melt or fuse powder to form the part, occasional liquid metal and/or metal-vapor is blown out of the transient melt-pool created by the laser as it fuses the powder to form the new part layer. The droplets of liquid and vapor metal being blown out of the melt pool can also entrain nearby solid particles. These clumps of metal material that can occasionally come out of the melt pool region during the laser scan process can contain resolidified melted metal and unmelted powder particles. They are often referred to as "spatter particles" and can be formed when several particles come together and are fused/melted together to form an arbitrary shape. They can be significantly larger than the typical feedstock powder. They will be referred to them as parasite particles or oversized particles in this document. The spatter particles can land at random locations anywhere on the build plane.

Referring to FIG. 2D, an illustration shows clumps 212 or "spatter particles" on the powder 204 on the build plane 206. Those spatter particles 212 which are significantly larger than the original particles in the powder feedstock can have adverse effects on the powder spreading process, which can also decrease the quality of the parts produced. The effects include but are not limited to: uncontrollable change in the morphology of the powder, uncontrollable change in powder size distribution, production of pores when the laser goes over the parasites and cannot melt deep down to the substrate, pores act as stress concentrators that can cause earlier failure of the part, the presence of one large parasite can increase the likelihood of producing another large spatter in a chain reaction type of process.

Figure 2E:
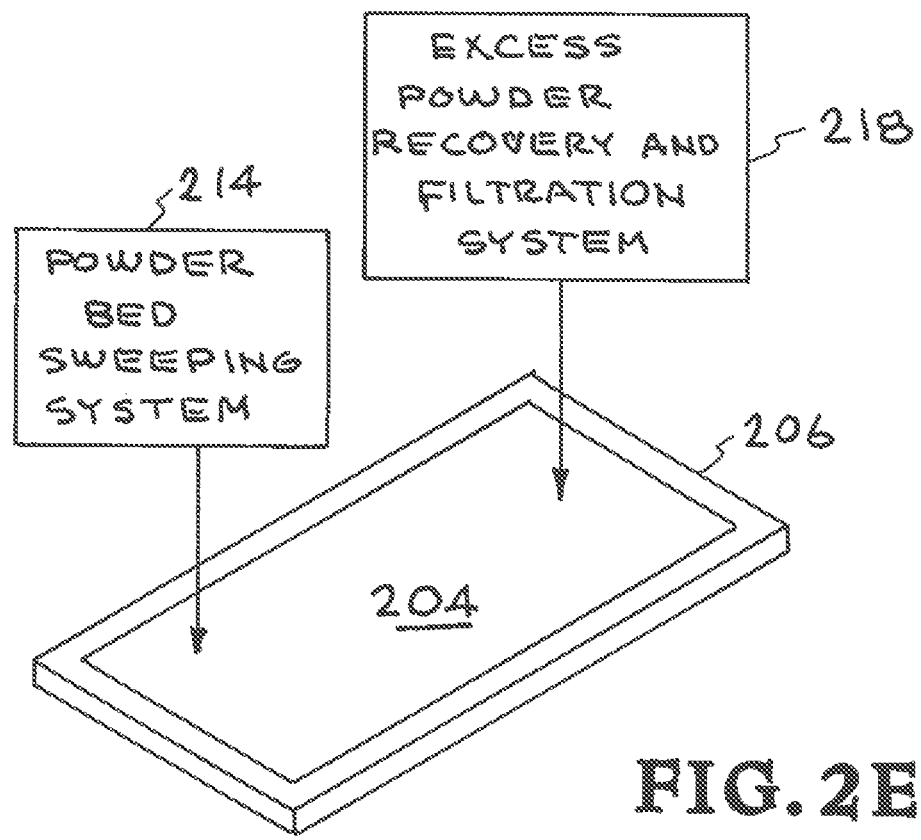
FIG. 2E is an illustration of a powder bed sweeping system that is employed to proceed across the fused powder sweeping any "clumps or spatter" particles as well as any excess powder into a collection unit.

Referring to FIG. 2E, an illustration shows the inventor's powder bed sweeping system 214 that is employed to proceed across the fused powder 204 sweeping any clumped particles as well as any excess powder into a collection unit 218. The clumps and excess powder in the collection unit 218 are directed through a filtration system that separates out the clumps and sends the excess powder back to the powder dispenser.

Referring now to FIGS. 3A through D, schematic illustrations shows a first embodiment of the inventor's sweeping system. The inventor's sweeping system is designed to be used in an oversize-spatter amelioration process, which is intended to be performed after the laser scan process is completed for a given powder layer, and before the next layer of feedstock powder is spread over the build-plate. In various embodiments the overall spatter-amelioration apparatus and process can consist of two steps: (1) oversize-particle detection and (2) elimination of oversize-particles or amelioration of the deleterious effects of oversize-particles on build quality.

Depending on the embodiment selected, these two steps can be performed by one apparatus and its application, or they can be performed separately. In each embodiment described the apparatus and its application, is designed to minimize disturbance of the existing unused feedstock powder surface on the build plate and partially built part(s) existing on the bed plane. The efficiency and robustness of the apparatus and its application differs depending on the embodiment selected. Preferred embodiments are described.

Referring now to FIG. 3A, an illustration shows that laser scan fusion is performed on the first powder layer. Laser scan fusion 302 is performed on the powder 304 on the build plane 306. In the process of scanning the laser to melt or fuse powder to form the part, occasional liquid metal and/or metal-vapor is blown out of the transient melt-pool created by the laser as it fuses the powder to form the new part layer. The droplets of liquid and vapor metal being blown out of the melt pool can also entrain nearby solid particles. These clumps of metal material that can occasionally come out of the melt pool region during the laser scan process can contain resolidified melted metal and unmelted powder particles. They are often referred to as "spatter particles" and can be formed when several particles come together and are fused/melted together to form an arbitrary shape. They can be significantly larger than the typical feedstock powder. They will be referred to them as parasite particles or oversized particles in this document. The spatter particles can land at random locations anywhere on the build plane.

Referring to FIG. 3B, an illustration shows a first embodiment of the inventor's powder bed sweeping system. The components of inventors' sweeping system shown in FIG. 3B are listed below.

304—powder,
306—build plane,
308—sweeping system,
312—bristles,
314—collection unit, and
316—spatter particles.

The inventor's powder bed sweeping system is employed to proceed across the fused powder 304 sweeping any clumped particles 316 as well as any excess powder into the collection unit 314. The collection unit 314 is shown as located adjacent the build plane 306; however, it is to be understood that the collection unit 314 can be located adjacent and travel with the sweeping system 308.

The sweeping system 308 provides a precisely designed brush over the powder bed. The brush consists of bristles 312 spaced just far enough apart to allow the largest feedstock powder particles to pass between the bristles, but small enough to pick up any oversize particles on top of the powder bed. The bristles 312 of the brush are chosen and installed to enable a back-sloping tilt (e.g. in the range of 45 to 75 degrees from vertical) to ensure that the large particles 316 picked up in front of the brush, tend to ride up on the bristles 312 as the brush is drawn over the powder bed at a fixed height. The bristles 312 are flexible with a flexibility within the range of 45 to 75 degrees from vertical.

During the brushing process the brush is held at a precisely set height so that the tips of the bristles are just touching the very top surface of the feedstock powder on the build plate. Traversing over the entire bed surface with this oversize-particle pick-up brush removes any oversize particles sticking up above the powder bed surface, thus preventing them from interfering with the powder spreading of the next powder layer. The brush serves to both detect and to remove any oversized particles protruding above the build plate powder bed.

Referring to FIG. 3C, an illustration of the powder bed sweeping system shows tilted bristles 312 beginning to sweep the clumped particles 316 as well as any excess powder into the collection unit 314. One variation of this first embodiment is the material that makes up the brush/bristles system. One embodiment is simple synthetic plastic like nylon bristles 312. The important point is to prevent the brush from impacting, scratching and/or damaging the surface of the part that is being built. The bristle's height and diameter can vary depending on what is optimal for each powder alloy. For example, for light alloys like Aluminum, the bristles would be soft. For heavier alloys like stainless steel (3 times denser), the bristles would be stiffer. The magnitude of the stiffness would be determined by trial and error or by modeling, so as to enable the brush to move the oversized particle. Also, bristles stiffness would have a gradient, in that, the forward part touching the powder would be softer than the back part if that is necessary. The bristles would also be allowed to vibrate with a frequency determined by the amount the bristles need to travel in space to push an oversized particle. An estimate of range of few Hz in oscillations is expected.

Referring to FIG. 3D, an illustration shows the powder bed sweeping system with the tilted bristles 312 completing the sweeping of the clumped particles as well as any excess powder into the collection unit 314. The sweeping system 308 back-tilted bristles 312 are spaced just far enough apart to allow the largest feedstock powder particles to pass between the bristles, but small enough to pick up any oversize particles 316 on top of the powder bed. The sweeping system 308 sweeps the clumped particles 316 into the collection unit 314.

Referring now to FIGS. 4A through D, schematic illustrations shows a second embodiment of the inventors' sweeping system. The inventors' sweeping system is designed to be used in an oversize-spatter amelioration process, which is intended to be performed after the laser scan process is completed for a given powder layer, and before the next layer of feedstock powder is spread over the build-plate.

Referring now to FIG. 4A, an illustration shows that laser scan fusion is performed on the first powder layer. Laser scan fusion 402 is performed on the powder 404 on the build plane 406. In the process of scanning the laser to melt or fuse powder to form the part, occasional liquid metal and/or metal-vapor is blown out of the transient melt-pool created by the laser as it fuses the powder to form the new part layer. The droplets of liquid and vapor metal being blown out of the melt pool can also entrain nearby solid particles. These clumps of metal material that can occasionally come out of the melt pool region during the laser scan process can contain resolidified melted metal and unmelted powder particles. They are often referred to as "spatter" particles and can be formed when several particles come together and are fused/melted together to form an arbitrary shape. They can be significantly larger than the typical feedstock powder. They will be referred to them as parasite particles or oversized particles in this document. The spatter particles can land at random locations anywhere on the build plane.

Referring to FIG. 4B, an illustration shows another embodiment of a powder bed sweeping system. The components of inventors' sweeping system shown in FIG. 4B are listed below.

404—powder,
    406—build plane,
    408—sweeping system,
    410—tines,
    412—bristles,
    414—collection unit, and
    416—spatter particles.

The inventor's powder bed sweeping system is employed to proceed across the fused powder 404 sweeping any clumped particles 416 as well as any excess powder into the collection unit 414. The collection unit 414 is shown as located adjacent the build plane 406; however, it is to be understood that the collection unit 414 can be located adjacent and travel with the sweeping system 408.

The sweeping system 408 provides a precisely designed brush/rake over the powder bed. The brush/rake consists of tines 410 and bristles 412 spaced just far enough apart to allow the largest feedstock powder particles to pass between the bristles/tines, but small enough to pick up any oversize particles on top of the powder bed.

The back-sloping tilt of the bristles 312 of the brush/rake (e.g. in the range of 45 to 75 degrees from vertical) is such that the large particles picked up in front of the brush/rake, tend to ride up on the bristles 312 as the brush/rake is drawn over the powder bed at a fixed height. The tines 410 are stiff and provide pick up any oversize particles on top of the powder bed that are missed by the bristles 412. The tines 410 can pick up oversize particles that can be stuck on top of the powder bed.

Referring to FIG. 4C, an illustration shows the powder bed sweeping system 408 employed to proceed across the fused powder 404 sweeping any clumped particles 416 as well as any excess powder into the collection unit 414. An important point is to prevent the brush/rake from impacting, scratching and/or damaging the surface of the part that is being built. The bristle's height and diameter can vary depending on what is optimal for each powder alloy. For example, for light alloys like Aluminum, the bristles would be soft. For heavier alloys like stainless steel (3 times denser), the bristles would be stiffer. The magnitude of the stiffness would be determined by trial and error or by modeling, so as to enable the brush/rake to move the oversized particle. Also, bristles stiffness would have a gradient, in that, the forward part touching the powder would be softer than the back part if that is necessary. The bristles would also be allowed to vibrate with a frequency determined by the amount the bristles need to travel in space to push an oversized particle. An estimate of range of few Hz in oscillations is expected.

Referring to FIG. 4D, an illustration shows the powder bed sweeping system 408 sweeping the clumped particles 416 into the collection unit 414. The sweeping system 408 tines 410 and bristles 412 are spaced just far enough apart to allow the largest feedstock powder particles to pass between the tines, but small enough to pick up any oversize particles 416 on top of the powder bed. The sweeping system 408 sweeps the clumped particles 416 into the collection unit 414.

Figure 5:
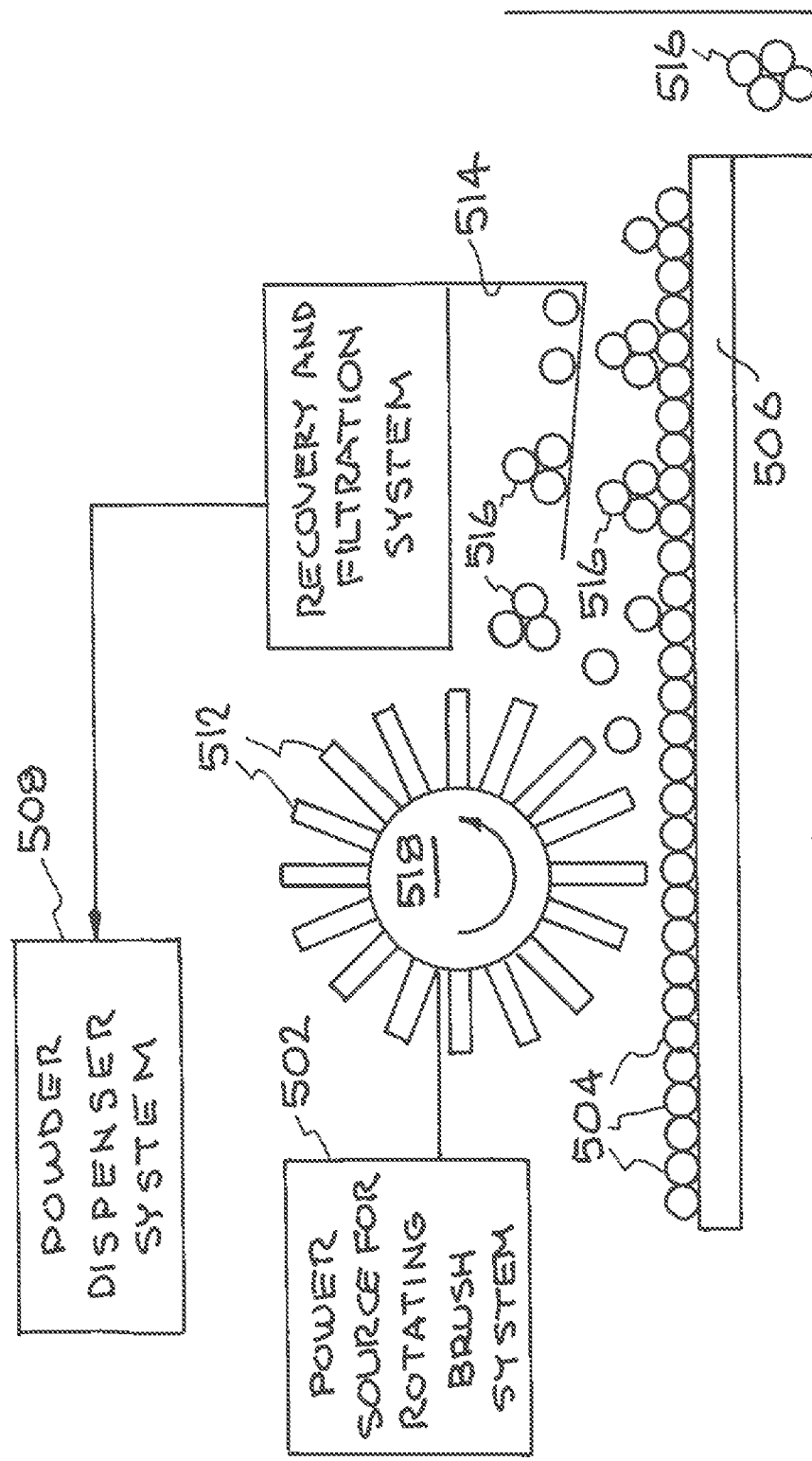
FIG. 5 is an illustration showing yet another embodiment of a powder bed sweeping system employed to proceed across the fused powder sweeping clumped particles as into a collection unit.

Referring now to FIG. 5, an illustration shows another embodiment of the inventor's powder bed sweeping system. The components of inventors' sweeping system shown in FIG. 5 are listed below.

502—power source,
504—powder,
506—build plane,
508—powder dispenser,
512—bristles,
514—collection unit and recovery system,
516—spatter particles,
518—rotating brush.

The inventor's powder bed sweeping system employed to proceed across the fused powder sweeping clumped particles 516 as into a collection unit(s) 514. The sweeping system provides a precisely designed rotating brush 518 that is moved over the powder bed. The rotating brush 518 is powered by power system 502. The rotating brush 518 has bristles spaced just far enough apart to allow the largest feedstock powder particles 504 to pass between the bristles, but small enough to pick up any oversize particles 516 on top of the powder bed. The rotating brush 518 is drawn over the powder bed at a fixed height. During the brushing process the rotating brush 518 is held at a precisely set height so that the tips of the bristles are just touching the very top surface of the feedstock powder 504 on the build plate 506. Traversing over the entire bed surface with this oversize-particle pick-up rotating brush 518 removes any oversize particles sticking up above the powder bed surface, thus preventing them from interfering with the powder spreading of the next powder layer. The rotating brush 518 serves to both detect and to remove any oversized particles protruding above the build plate powder bed. The rotating brush 518 serves to sweep any clumped particles 516 as well as any excess powder into the collection unit 514. The collection unit 514 is shown as located adjacent rotating brush 518; however, it is to be understood that the collection unit 514 can be located adjacent the build plane 506.

Figure 6:
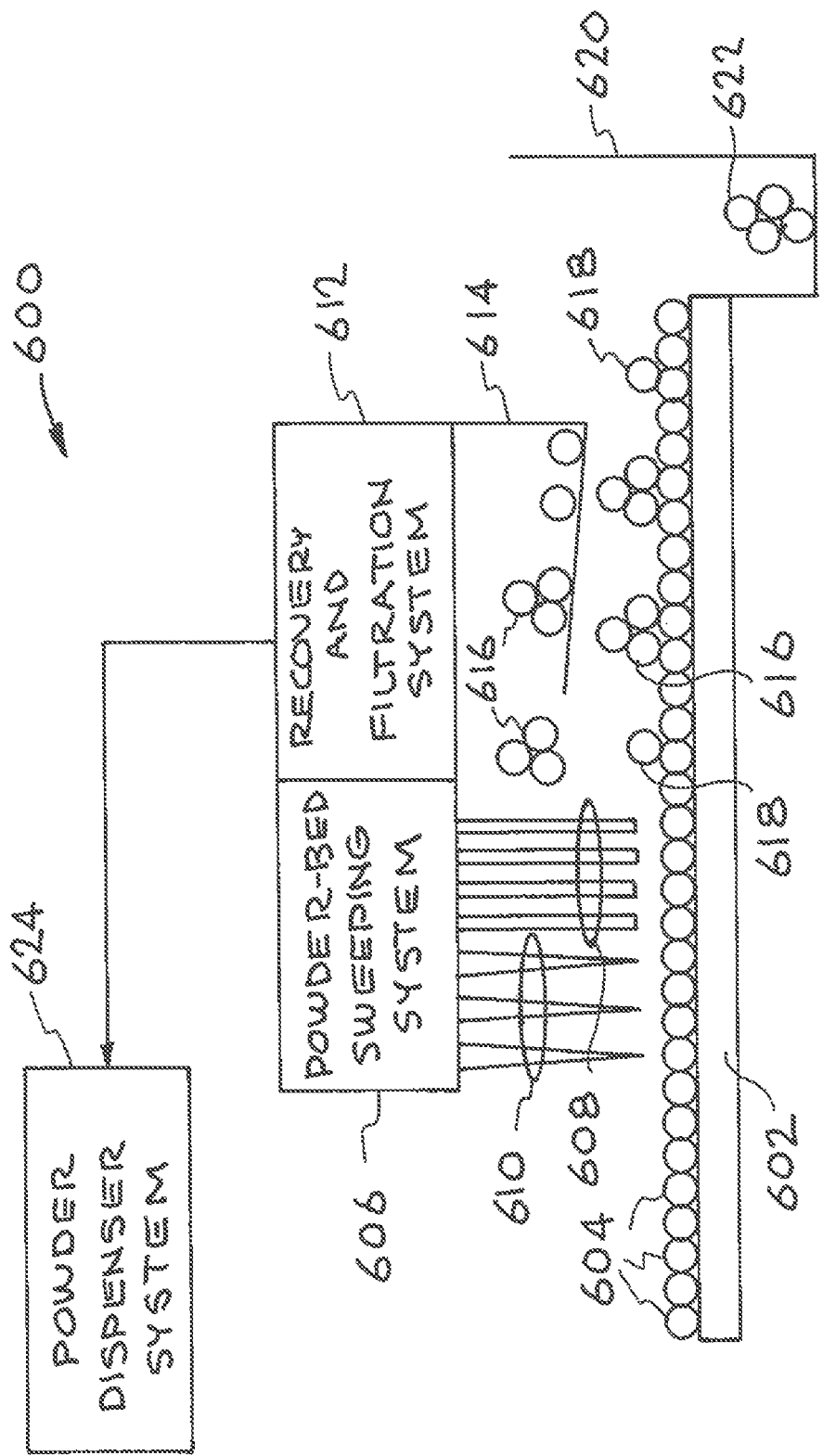
FIG. 6 is an illustration showing a further embodiment of a powder bed sweeping system employed to proceed across the fused powder sweeping clumped particles into a collection unit.

Referring now to FIG. 6, a schematic illustration shows another embodiment of the inventors' sweeping system. The inventors' sweeping system is designed to be used in an oversize-spatter amelioration process, which is intended to be performed after the laser scan process is completed for a given powder layer, and before the next layer of feedstock powder is spread over the build-plate. The embodiment of the inventors' sweeping system shown in FIG. 6 is designated by the reference numeral 600. The components of inventors' sweeping system 600 shown in FIG. 1 are listed below.

602—substrate/build platform,
604—fused/melted layer,
606—brush system,
608—flexible bristles,
610—stiff bristles (tines),
612—recovery system,
614—primary tray carried by brush system/recovery system,
616—spatter particles or clumps,
618—excess powder particles,
620—secondary tray,
622—large recovered clump, and
624—powder dispenser system.

The inventors' sweeping system 600 is employed to proceed across the fused powder 604 sweeping any clumped particles 616 as well as any excess powder 618 into a collection unit(s) 414/620. The sweeping system 600 provides a precisely designed brush/rake over the powder bed. The brush/rake consists of tines 610 and bristles 612 spaced just far enough apart to allow the largest feedstock powder particles to pass between the bristles/tines, but small enough to pick up any oversize particles on top of the powder bed.

The back-sloping tilt of the bristles 612 of the brush/rake (e.g. in the range of 45 to 75 degrees from vertical) is such that the large particles picked up in front of the brush/rake, tend to ride up on the bristles 612 as the brush/rake is drawn over the powder bed at a fixed height. The sweeping system tines 610 and bristles 612 are spaced just far enough apart to allow the largest feedstock powder particles to pass between the tines, but small enough to pick up any oversize particles 616 and 618 on top of the powder bed. The sweeping system 600 sweeps the oversize particles 616 and 618 into the collection units 614 and 622. The tines 610 are stiff and provide pick up any oversize particles on top of the powder bed that are missed by the bristles 612. The tines 610 can pick up oversize particles that can be stuck on top of the powder bed.

An important point is to prevent the brush/rake from impacting, scratching and/or damaging the surface of the part that is being built. The bristle's height and diameter can vary depending on what is optimal for each powder alloy. For example, for light alloys like Aluminum, the bristles would be soft. For heavier alloys like stainless steel (3 times denser), the bristles would be stiffer. The magnitude of the stiffness would be determined by trial and error or by modeling, so as to enable the brush/rake to move the oversized particle. Also, bristles stiffness would have a gradient, in that, the forward part touching the powder would be softer than the back part if that is necessary. The bristles would also be allowed to vibrate with a frequency determined by the amount the bristles need to travel in space to push an oversized particle. An estimate of range of few Hz in oscillations is expected.

Figure 7A:
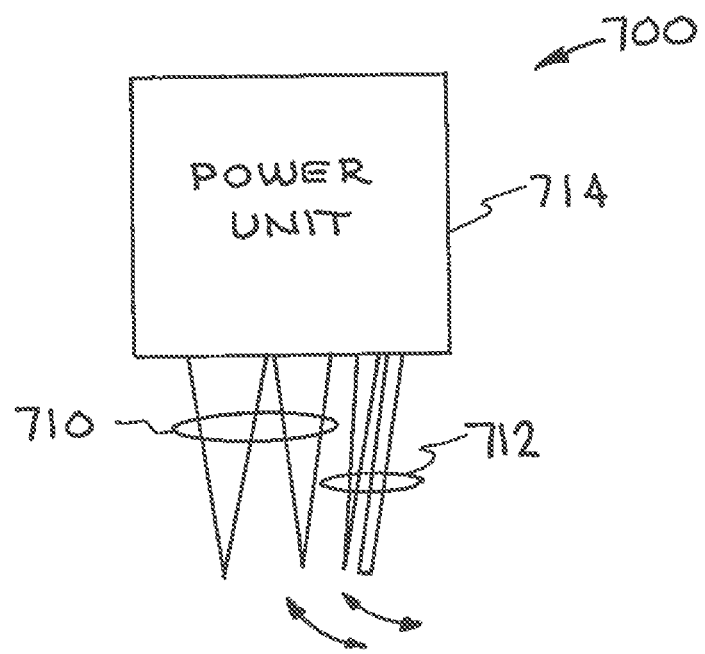
FIG. 7A is an illustration showing vibrating bristles before they would contact the "clumps or spatter" particles.
Figure 7B:
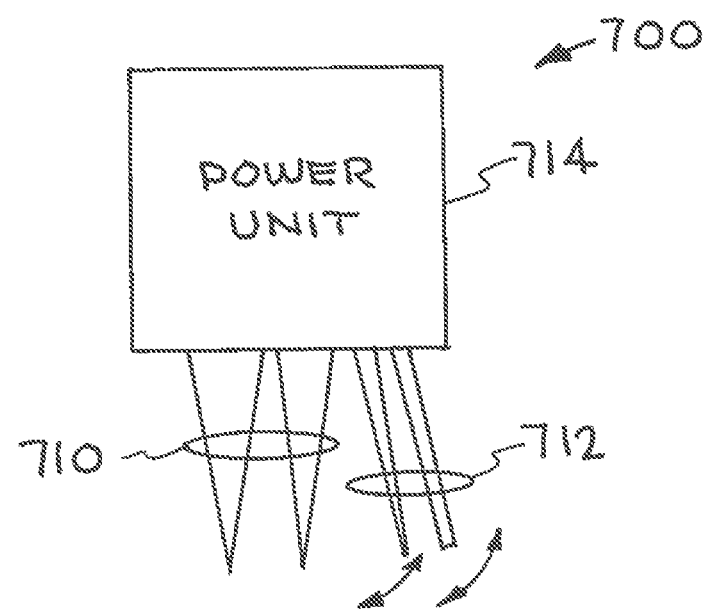
FIG. 7B is an illustration showing vibrating bristles after they would have contacted the "clumps or spatter" particles.

Referring now to FIGS. 7A and 7B, schematic illustrations shows a yet another embodiment of the inventors' sweeping system. The inventors' sweeping system is designed to be used in an oversize-spatter amelioration process, which is intended to be performed after the laser scan process is completed for a given powder layer, and before the next layer of feedstock powder is spread over the build-plate.

Referring again to FIGS. 7A and 7B, illustrations show a powder bed sweeping system 700 that is employed to proceed across the fused powder sweeping any clumped particles as well as any excess powder into a collection unit. The sweeping system provides a precisely designed brush/rake over the powder bed. The brush/rake consists of tines 710 and bristles 712 spaced just far enough apart to allow the largest feedstock powder particles to pass between the bristles/tines, but small enough to pick up any oversize particles on top of the powder bed.

The back-sloping tilt of the bristles 712 of the brush/rake (e.g. in the range of 45 to 75 degrees from vertical) is such that the large particles picked up in front of the brush/rake, tend to ride up on the bristles 712 as the brush/rake is drawn over the powder bed at a fixed height. The tines 710 are stiff and provide pick up any oversize particles on top of the powder bed that are missed by the bristles 712. The tines 710 can pick up oversize particles that can be stuck on top of the powder bed.

The front brushes bristles are powered to vibrate. A power unit 714 provides vibration of the bristles 712. The front brush bristles 712 vibrate to forward kick the clusters or spatters.

Figure 8:
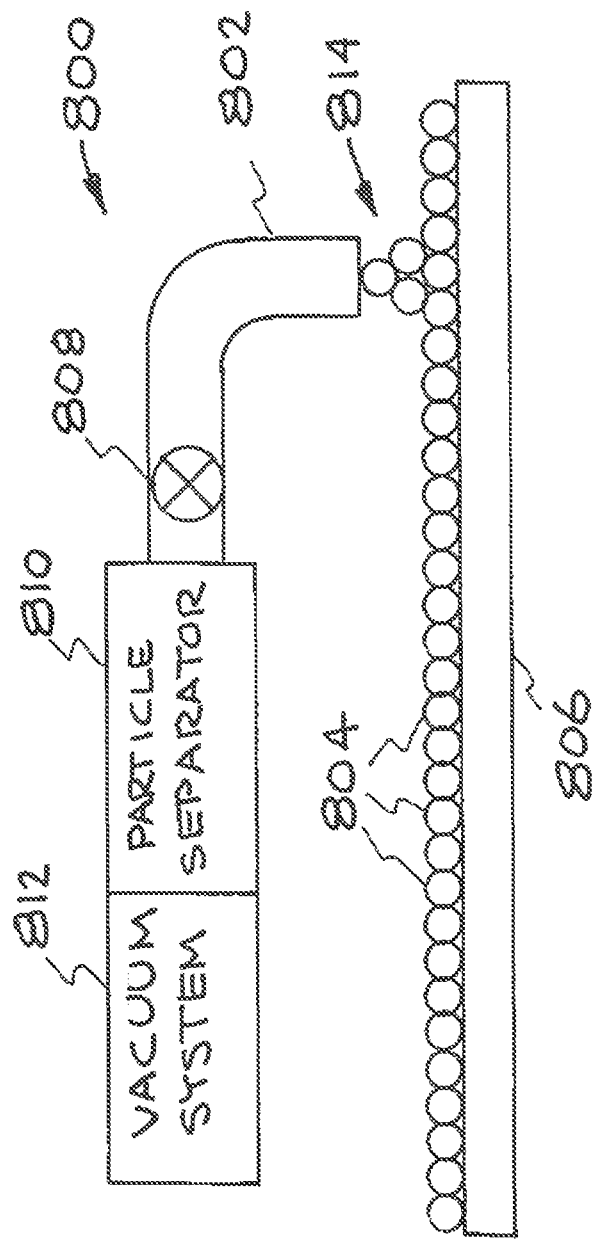
FIG. 8 is an illustration showing another embodiment of a powder bed sweeping system employed to proceed across the fused powder vacuuming clumped particles into a collection unit.

Referring now to FIG. 8, an illustration shows another embodiment of the inventor's powder bed sweeping system employed to proceed across the fused powder vacuuming clumped particles as into a collection unit. This embodiment is designated generally by the reference numeral 800. The components of inventors' sweeping system 800 shown in FIG. 8 are listed below.

802—nozzle,
804—particle bed,
806—substrate,
808—air valve,
810—particle separator,
812—vacuum system, and
815—spatter.

The structural elements of this embodiment of the inventor's powder bed sweeping system 800 having been identified and described, the operation of the system 800 will now be considered. The inventors' sweeping system 800 is employed to proceed across the fused powder 804 vacuuming clumped particles. The sweeping system provides a vacuum system 812 having a nozzle 802 and a particle separator 810. The nozzle 802 is drawn over the powder bed 804 at a fixed height. During the process the nozzle 802 is held at a precisely set height over the feedstock powder 804 on the substrate 806. Traversing over the entire bed surface with this vacuum system 812 having a nozzle 802 removes any oversize particles 814 sticking up above the powder bed 804, thus preventing them from interfering with the powder spreading of the next powder layer.

The inventors' sweeping system also can include over size particle detection, quality control and machine learning. The over size particle detection is determined by shining rays of light almost tangentially to the build surface and moving the light source while analyzing the shadow motion. Large clusters would leave large shadows, hence they become detectable in this fashion. A machine learning type algorithm can be used to detect these shadows and help automate the process.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. The A powder bed fusion apparatus, comprising:
    a powder dispenser that provides powder layers on a build platform;
    a laser that fuses said powder layers, wherein spatter particles are produced on said powder layers;
    a powder bed sweeper that sweeps said spatter particles from said powder layers;
    a power source included in said powder bed sweeper; and
    vibrating brush bristles connected to said power source,
    wherein said vibrating brush bristles contact said spatter particles and sweep said spatter particles from said powder layer and
    wherein said vibrating brush bristles have a back-sloping tilt of said vibrating brush bristles within the range of forty five degrees to seventy five degrees from vertical.

2. The A powder bed fusion apparatus, comprising:
    a powder dispenser that provides powder layers on a build platform;
    a laser that fuses said powder layers, wherein spatter particles are produced on said powder layers;
    a powder bed sweeper that sweeps said spatter particles from said powder layers;
    a power source included in said powder bed sweeper; and
    vibrating brush bristles connected to said power source,
    wherein said vibrating brush bristles contact said spatter particles and sweep said spatter particles from said powder layer, and
    wherein said vibrating brush bristles have a back-sloping tilt of said vibrating brush bristles within the range of forty five degrees to seventy five degrees from vertical, and wherein said powder layers have individual powder particles with a powder particle diameter and wherein said vibrating brush bristles have spacing that is greater than said powder particle diameter.

3. A powder bed fusion method comprising the steps of:
providing a powder dispenser that provides powder layers on a build platform;
providing a laser that fuses said powder layers, wherein spatter particles are produced on said powder layers;
providing a powder bed sweeper that sweeps said spatter particles from said powder layers wherein said sweeper has brush bristles;
providing a power source connected to said powder bed sweeper; and
using said power source to cause said brush bristles to vibrate,
wherein said step of using said power source to cause said brush bristles to vibrate causes said vibrating brush bristles to have a back-sloping tilt, and
wherein said step of using said power source to cause said brush bristles to vibrate causes said vibrating brush bristles to have a back-sloping tilt within the range of forty five degrees to seventy five degrees from vertical.

4. A powder bed fusion method comprising the steps of:
providing a powder dispenser that provides powder layers on a build platform;
providing a laser that fuses said powder layers, wherein spatter particles are produced on said powder layers;
providing a powder bed sweeper that sweeps said spatter particles from said powder layers wherein said sweeper has brush bristles;
providing a power source connected to said powder bed sweeper; and
using said power source to cause said brush bristles to vibrate,
wherein said step of using said power source to cause said brush bristles to vibrate causes said vibrating brush bristles to have a back-sloping tilt, wherein said step of using said power source to cause said brush bristles vibrate causes said vibrating brush bristles to have a front-sloping tilt.

\* \* \* \* \*